March 25, 1969 — J. F. ALLEN — 3,434,558
COLLAPSIBLE SELF-POWERED VEHICLE STRUCTURE
Filed Nov. 28, 1966 — Sheet 1 of 2

INVENTOR.
JOHN F. ALLEN
ATTORNEYS

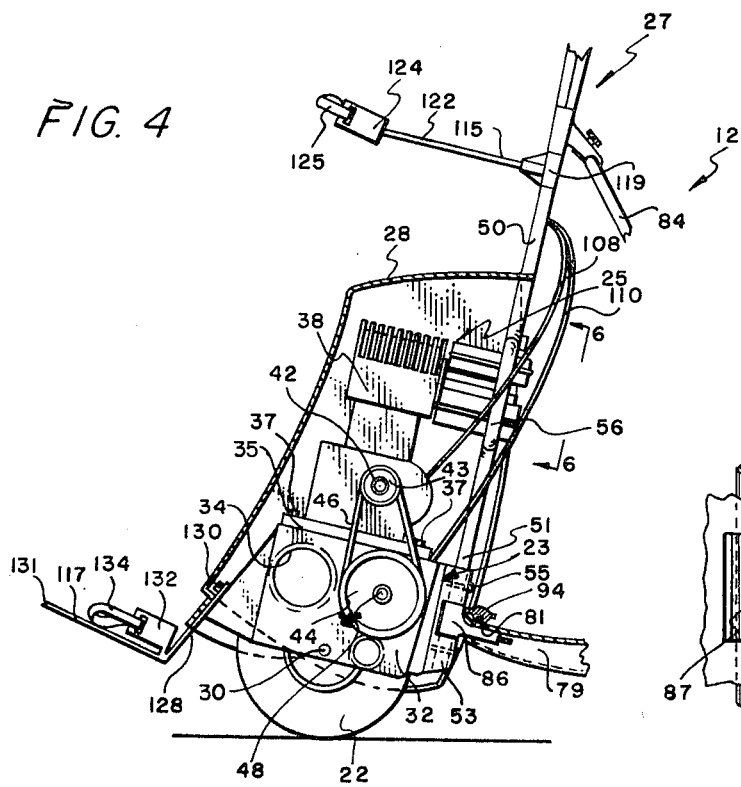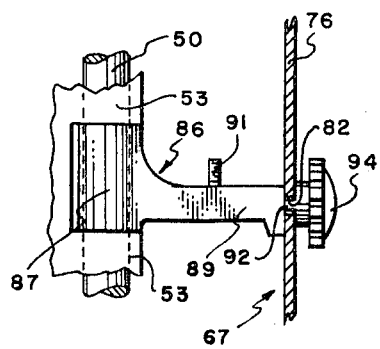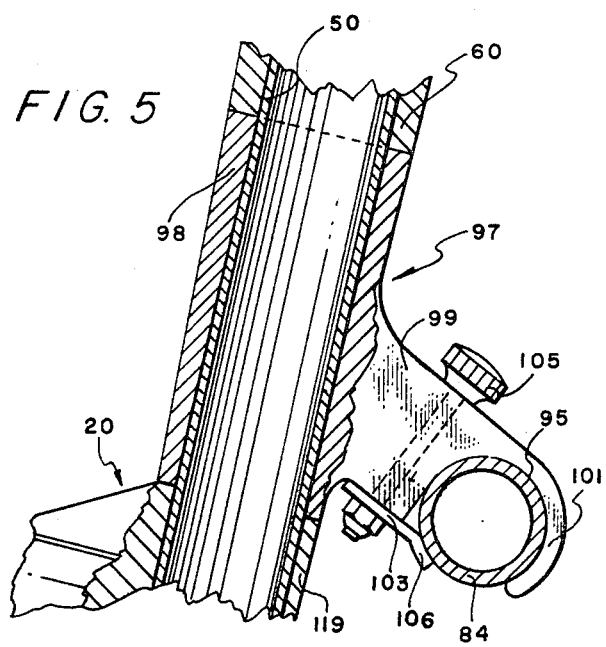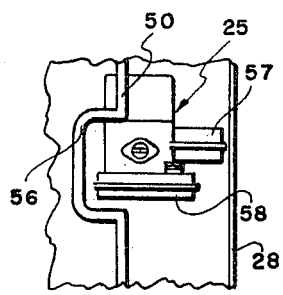

United States Patent Office 3,434,558
Patented Mar. 25, 1969

3,434,558
COLLAPSIBLE SELF-POWERED VEHICLE
STRUCTURE
John F. Allen, Municipal Airport,
McPherson, Kans. 67460
Filed Nov. 28, 1966, Ser. No. 597,253
Int. Cl. B62d 61/06; B62k 15/00
U.S. Cl. 180—26           7 Claims

ABSTRACT OF THE DISCLOSURE

This invention is a collapsible self-powered vehicle including a support frame; wheel members mounted on the support frame; a motor means mounted on the support frame connected to the wheel members to drive the same; an upright handle member connected to the frame; a support platform mounted on wheel means releasably connected to the support frame; and a stabilizer member pivotally connected to the frame and the handle member in order to maintain the platform in a trailing position. More specifically, this invention is a portable vehicle including a generally horizontally extended support platform to receive the operator thereon and having the same releasably connected to a main drive unit so as to be movable to a generally upright position for storage and transporting purposes.

---

Various types of one or two passenger self-propelled vehicles are known to the prior art such as motorcycles, motor bikes, scooters, golf carts, etc., adapted to be easily maneuvered and operated with a low cost of operation. However, the prior art devices are limited in load carrying capacities, represent substantial initial investment, and require considerable storage area. Additionally, the prior art devices are substantially bulky in size and weight and cannot be readily collapsed as desired for conveyance to a given area in which the vehicle is to be operated.

In accordance with the present invention, in a preferred specific embodiment, a new passenger and cargo vehicle is provided which includes a power drive unit or assembly having a passenger support unit releasably connected thereto. The power drive unit includes a wheel rotatably mounted within a frame; an upright control handle secured to the frame; an engine or motor mounted on the frame and operably connected to drive the wheel; and an outer housing enclosing the motor, frame, and the wheel. The passenger support unit includes a support platform having one end connected to wheels and the other end releasably connected through a lug to the lower end of the control handle. The support platform is given vertical stability by a stabilizer sway bar assembly secured to the one end of the platform and extended upwardly where it is releasably secured to a brace rotatably mounted on an upper portion of the control handle. The passenger stands on the support platform grasping an upper T-section of the control handle for stabilizing himself and guiding the vehicle by rotation of the handle with the passenger support unit trailing therebehind. Mounted on the forward side of the control handle and the frame are upper and lower brackets, respectively, adapted to securely hold a golf bag or the like thereto.

Accordingly, it is an object of this invention to provide a new collapsible, portable vehicle overcoming the above-mentioned disadvantages of the prior art devices.

Another object of this invention is to provide a collapsible vehicle structure having a minimum amount of weight with a sufficient amount of power so as to be readily movable with operator and cargo as desired to a given area.

A further object of this invention is to provide a collapsible, portable vehicle requiring a minimum amount of skill and being extremely safe to operate, maneuver, and control.

One further object of this invention is to provide a collapsible, portable vehicle having a power drive unit with a passenger supporting unit releasably connected thereto whereupon these units can be readily separated for purposes of storage and conveyance to a given area in which to be used.

One further object of this invention is to provide a portable, collapsible vehicle structure having a forward power drive unit, a passenger drive unit releasably connected thereto, and a cargo carrying bracket means connected thereto readily adaptable to carry golf bags or the like.

One other object of this invention is to provide a vehicle that is relatively inexpensive to manufacture, simple to operate, low in capital and operating costs, and readily collapsible for storage and transporting purposes.

Various other objects, features, and advantages of the invention will become apparent to those skilled in the art from the following discussion taken in conjunction with the accompanying drawings, in which:

FIG. 4 is a fragmentary sectional view taken along line 4—4 in FIG. 3;

FIG. 5 is an enlarged fragmentary elevational view of the connecting clamp means of this invention having portions thereof broken away for clarity;

FIG. 6 is a fragmentary sectional view taken along lines 6—6 in FIG. 4; and

FIG. 7 is a fragmentary elevational view illustrating an attachment lug of the portable vehicle of this invention.

Figures 1, 2, 3:
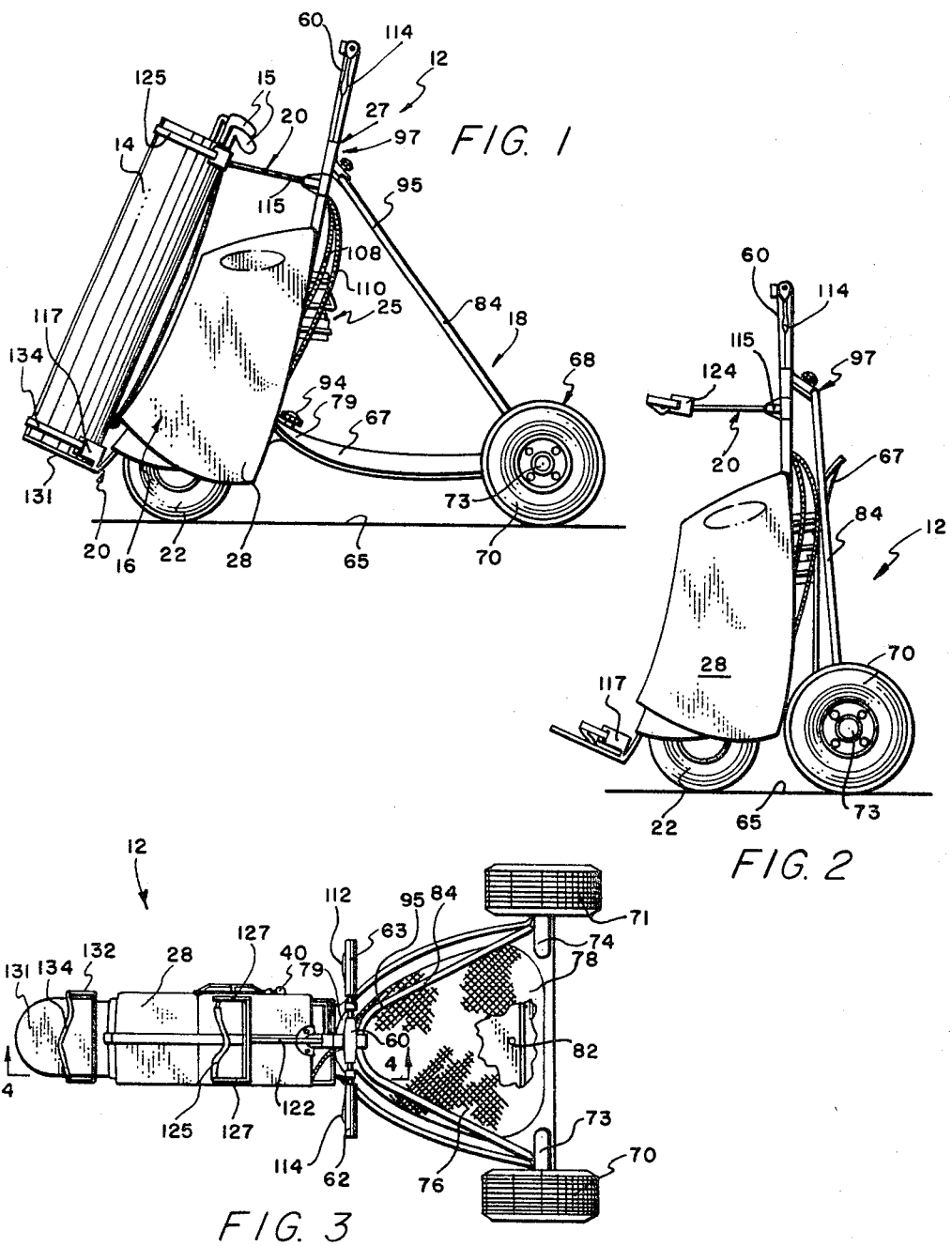
FIG. 1 is an elevational view of the portable vehicle of this invention illustrating a golf bag connected thereto.
FIG. 2 is an elevational view of the portable vehicle of this invention illustrating the same in the collapsed or storage position.
FIG. 3 is a top plan view of the portable vehicle of this invention.

The following is a discussion and description of preferred specific embodiments of the new portable vehicle structure of this invention, such being made with reference to the drawings, whereon the same reference numerals are used to indicate the same or similar parts and/or structure. It is to be understood that such discussion and description is not to unduly limit the scope of the invention.

Referring to the drawings in detail and in particular to FIG. 1, the portable, collapsible vehicle apparatus of this invention indicated generally at 12, is illustrated having a conventional golf bag 14 with clubs 15 mounted thereon. The vehicle apparatus 12 includes a power drive unit 16 having a passenger support assembly or unit 18 releasably connected thereto. Additionally, a cargo support means 20 is connected to the power drive unit 16 and extended forwardly therefrom to support the golf bag 14 and the like.

More specifically, the power drive unit 16 includes a wheel member 22 rotatably mounted within a frame assembly 23; motor means 25 secured to the frame assembly 23; an upright control handle means 27 secured to the frame assembly 23; and an outer engine cover or housing 28 secured to the frame assembly 23. The wheel member 22 is of a conventional type having a central rotatable axis 30 with opposite ends mounted in a casing 32 of the frame assembly 23. The casing 32 is of a general rectangular box shape having cut-outs 34 to reduce the weight thereof.

On an upper flat surface 35 of the casing 32 is secured the motor means 25 as by bolts 37. The motor means 25 consists of a conventional gasoline powered internal combustion engine 38 having a pull cord 40 for starting the same. The engine 38 has an output shaft 42 connected through pulleys 43 and 44 and a belt 46 mounted thereon to rotate a jack shaft 48. A gearing means (not shown) interconnects the jack shaft 48 and the wheel member 22 to rotate the same at a reduced, proper speed.

The control handle means 27 includes an elongated main body or shaft 50 having a lower end portion 51 extended within clamp halves 53 and secured to the frame assembly 23 as by bolts 55. An intermediate portion of the shaft 50 is bent laterally to form a substantially U-shaped portion 56 to extend outwardly and around the oil and gasoline containers 57 and 58, respectively, of the engine 38. The upper end of the handle means 27 is formed with a T-section 60 having outer laterally extended grip portions 62 and 63. It is seen that the rigid connection of the control handle means 27 to the frame assembly 23 results in a turning or guiding movement of the wheel member 22 on a supporting surface 65 when the shaft 50 is rotated about the vertical axis of the wheel member 22 through lateral movement of the grip portions 62 and 63.

The engine housing 28 is of an irregular contour being mainly aesthetic in value and secured to both the frame assembly 23 and the shaft 50 of the handle means 27 for rigidity. It is obvious that the housing 28 functions to cover up the motor means 25 as a safety shield against moving parts and, additionally, presents an attractive appearance. It is obvious that the power drive unit 16 presents a compact, light weight structure operable to drive itself on rotation of the wheel member 22 by the engine 38; however, the power drive unit 16 is not self-supporting being sustantiallly inoperative without the passenger support unit 18.

As shown in FIGS. 1 and 3, the passenger support unit 18 includes an enlarged pan or platform 67 of generally U-shape having wheel means 68 connected to the uncurved end thereof. The wheel means 68 consist of wheel members 70 and 71 rotatably mounted on stub shafts 73 and 74, respectively, which, in turn, are secured to the undesrsurface of the platform 67 as by bolts, welding, or the like. The platform 67 is an irregular shape in transverse cross section having an indented central portion 76 adapted to receive a non-skid rubber mat 78 for safety reasons to become obvious. Additionally, a forward or tongue portion 79 of the platform 67 has a hole 81 in conjuction with a similar hole 82 in the central portion 76 for operation and storing purposes, respectively, as will be explained.

The passenger support unit 18 is further provided a tubular stabilizer sway bar 84 bent into a substantially V-shape having the divergent ends thereof pivotally connected as by bolts to the platform 67 adjacent the wheel members 70 and 71, respectively.

In the use and operation of the vehicle apparatus 12, the power drive unit 16 is extended in an upright position having the tongue portion 79 of the platform 67 connected to an attachment lug 86 rotatably mounted on the upright shaft 50. More specifically as shown in FIG. 7, the attachment lug 86 has a main cylindrical body 87 mounted about the shaft 50 within a central spacing of the clamp halves 53 providing for limited rotational movement thereon. It is seen that the clamp halves 53 restrict axial movement of the attachment lug 86. A rearwardly extended projection 89 is integral with the body 87 having an upright bolt 91 and a rearwardly extended bolt 92 extended substantially perpendicular thereto. The upright bolt 91 is placed into the hole 81 in the tongue portion 79 of the platform 67 with a knob member 94 mounted on the bolt 91 holding the platform 67 secured therebetween. It is obvious that the rotational movement of the lug 86 permits the turning of the passenger support unit 18 trailing therebehind.

In order to provide vertical stability to the passenger support unit 18, the stabilizer sway bar 84 is inclined upwardly and forwardly whereupon a mid-portion 95 is releasably connected to a support clamp means 97. As shown in FIG. 5, the support clamp means 97 includes a cylindrical mid-portion 98 mounted about the shaft 50 and held against axial movement thereon by being positioned between and adjacent a portion of the cargo support means 20 and the T-section 60 of the handle means 27. Integral with the mid-portion 98 is a laterally extended lug portion 99 having an arcuate portion 101 adapted to receive the stabilizer sway bar 84 in contact therewithin. A clamp member 103 mounted on the bottom side of the lug portion 99 is held thereon by a knob or bolt member 105 threaded therein. The clamp member 103 has an angular lower portion 106 engagable with a portion of the stabilizer sway bar 84 to securely anchor the same thereto.

In starting the engine 38, the cord 40 is pulled similarly as on standard internal combustion engines found in lawn mower structures. The speed of the engine 38 and required stopping of the vehicle apparatus 12 is controlled pulled by cables 108 and 110 connected to a carburetor and brake assembly (not shown). The upper ends of the cables 108 and 110 are connected to lever members 112 and 114 operable by a grasping movement against the grip portions 62 and 63 to propel and stop, respectively, the portable vehicle apparatus 12. The combination operator-passenger stands upon the central portion 76 of the platform 67 having both hands grasping respective ones of the grip portions 62 and 63 of the handle means 27. It is obvious that control of the vehicle's speed by the hand grip lever members 112 and 114 operates in a manner substantially identical to controls found on motorcycles and the like. On movement of the shaft 50 by the turning of the grip portions 62 and 63, the forward or guide wheel member 22 pivots to control the direction of vehicular movement. It is seen that the stabilizing sway bar 84 operates to restrict swaying and undue vertical movement of the platform 67, and, additionally, acts as a guard to aid in preventing the operator from falling off the vehicle apparatus 12.

The cargo support means 20 includes upper and lower bracket members 115 and 117 cooperating to carry a cargo such as the golf bag 14 anchored thereto so as to function similar to a golf cart structure. The upper bracket member 115 has an anchor portion 119 secured to the shaft 50 as by a bolt with a forwardly projected support rod 122 extended substantially perpendicular thereto. The outer end of the rod 122 is formed with a laterally extended U-shaped clamp section 124 having a strap 125 connected to the parallel legs 127 thereof operable to releasably secure the upper portion of the golf bag 14 thereto. The lower bracket member 117 is of a stepped shape having a connector section 128 secured as by bolts 130 to the frame assembly 23. The connector section 128 is integral with a base plate 131 inclined thereto having an upright U-shaped guard section 132 at the junction of the section 128 and the base plate 131. The guard section 132 is provided with a strap 134 adapted to anchor the lower end of the golf bag 14 thereto. It is seen that the base plate 131 operates to vertically support the golf bag 14 with the straps 125 and 134 preventing lateral movement therefrom. It is obvious that a grocery cart basket, a passenger support structure, or the like could be secured to the upper bracket member 115 so that the collapsible, portable vehicle apparatus 12 of this invention could be used in shopping centers, amusement areas, etc., as well as on the golf course.

Upon completing normal usage of the portable vehicle apparatus 12 of this invention, it is obvious that the knob member 94 can be removed in a conventional manner from the bolt member 91 to lift the platform 67 upwardly off the supporting lug 86. Additionally, the bolt member 105 of the support clamp means 97 can be loosened whereupon the angular lower portion 106 of the clamp member 103 drops downwardly to permit movement of the stabilizer sway bar 84 outwardly of the lug portion 99 whereupon the power drive unit 16 and the passenger support unit 18 can be separated and individually lifted by a person and placed within a storage area or if desired, within the trunk of a conventional passenger automobile for movement thereaway. It is obvious that the stabilizer sway bar 84 is movable adjacent the support platform 67 to present a compact unit for placement in the trunk of the automobile. Also, it is obvious that the golf bag 14 can be disconnected from the upper and lower bracket members 115 and 117 for easy trunk storage.

Additionally, the vehicle apparatus 12 of this invention is collapsible into a compact, self-supporting position as shown in FIG. 2. This is accomplished by first releasing the platform 67 from the lug 86 as by removal of the knob member 94 from the bolt member 91. Thereupon, the support platform 67 is moved upwardly resulting in a forward movement of the wheel members 70 and 71 and the interconnected stabilizer sway bar 84. This results in a movement of the entire power drive unit 16 to a substantially vertical position whereupon the hole 82 in the central portion 76 of the platform 67 is mounted about the horizontally extended bolt member 92 of the attachment lug 86. Thereupon, the knob member 94 is placed upon the bolt member 92 to secure the platform 67 once again to the lug 86 but in a substantially upright or vertical position. It is obvious that this results in a substantially compact structure readily stored in a minimum amount of space and, additionally, the handle means 27 can be tilted rearwardly whereupon the entire vehicle apparatus 12 is supported on the wheel means 68 for ease in moving about such as to and from the area to which to be used. Additionally, it is obvious that this compact storage position could be used in case of engine failure for movement similar to a conventional non-motorized golf cart structure.

It is seen that the novel vehicular apparatus of this invention presents a compact, lightweight structure that is readily storable with a minimum amount of space requirement and easily assembled for movement to a given area in which to be used. The vehicle apparatus is relatively inexpensive to manufacture, reliable and durable in use, easy to maintain and operate, and presents an attractive, compact structure. It is obvious that the vehicle apparatus can be used for a multiple of purposes requiring the transportation of a passenger and his cargo thereon with a minimum amount of operating and initial cost.

As will be apparent from the foregoing description of the preferred embodiments of the applicant's vehicle apparatus, relatively simple and inexpensive means are provided which are readily collapsible and assembled so as to provide a highly efficient structure.

I claim:
1. A portable vehicle comprising:
 (a) a power drive unit having a support frame, a wheel member rotatably mounted on said frame adapted to contact a ground surface, motor or engine means connected to said wheel member to drive the same, and a handle member secured to said frame to control the angular direction of said wheel member, and
 (b) a passenger support unit having a support platform releasably connected to said frame, wheel means connected to said platform to elevate the same above the ground surface, and a stabilizer member pivotally connected to said platform and to said handle member operable to maintain said platform in a trailing position whereby an operator stands on said platform grasping said handle member for support and control thereof.

2. A portable vehicle as described in claim 1, wherein:
 (a) said stabilizer member of U-shape having lower divergent ends connected to said platform and an upper mid portion releasably connected to a bracket means mounted on said handle member operable to secure said platform in a given substantially horizontal plane while permitting pivotal movement about an upright axis.

3. A portable vehicle as described in claim 1, wherein:
 (a) said stabilizer member pivotal about the connection to said handle member to place said platform, said stabilizer member, and said wheel means adjacent said handle member in an upright position for storage purposes.

4. A portable vehicle as described in claim 1, including:
 (a) a first support bracket secured to said frame extended forwardly and laterally therefrom adjacent the ground surface, and
 (b) a second support bracket secured to an upper portion of said handle member extended forwardly and laterally therefrom adapted to cooperate with said first support bracket to secure a golf bag or the like thereto.

5. A portable vehicle as described in claim 4, wherein:
 (a) said first and second support brackets having strap members connected thereto to releasably engage the golf bag for anchoring the same.

6. A portable vehicle as described in claim 1, wherein:
 (a) said handle member having an upper T portion adapted to be grasped for lateral movement thereof, a clamp member rotatably mounted on said handle member adjacent and below said T portion, and a forwardly projected support bracket secured to said handle member adjacent and below said clamp member, and
 (b) said clamp member releasably connected to said stabilizer member to prevent vertical movement of said platform while permitting rotational movement about said handle member.

7. A portable vehicle which as described in claim 1, wherein:
 (a) said drive unit having a support lug rotatably mounted on said handle member, said support lug having vertical and horizontal bolt members with a knob member selectively mountable thereon, and
 (b) said platform having a forward and a rearward hole therein adapted to be selectively mounted about said vertical and said horizontal bolt members, respectively, and receive said knob member to anchor said support unit in the horizontally extended usage position or in the upright, storage position.

References Cited
UNITED STATES PATENTS

| | | |
|---|---|---|
| 1,658,068 | 2/1928 | White. |
| 1,838,877 | 12/1931 | Stevens _____ 280—87.04 X |
| 2,771,145 | 11/1956 | Peters _____ 180—26 |
| 2,919,758 | 1/1960 | Newton et al. _____ 180—25 |
| 3,043,389 | 7/1962 | Steinberg _____ 180—27 |
| 3,099,326 | 7/1963 | Weigel et al. _____ 180—26 |
| 3,229,782 | 1/1966 | Hilton _____ 180—26 |
| 3,354,975 | 11/1967 | Stuart _____ 180—26 |
| 3,388,761 | 6/1968 | Arpin _____ 180—27 |

KENNETH H. BETTS, *Primary Examiner.*

U.S. Cl. X.R.

280—287